Aug. 12, 1958 N. W. O'ROURKE 2,846,844
VARIABLE AREA THRUST DEFLECTOR-AUGMENTER
FOR JET ENGINES
Filed Jan. 24, 1956 2 Sheets-Sheet 1

INVENTOR.
NEIL W. O'ROURKE
BY
Knox & Knox

Aug. 12, 1958   N. W. O'ROURKE   2,846,844
VARIABLE AREA THRUST DEFLECTOR-AUGMENTER
FOR JET ENGINES
Filed Jan. 24, 1956    2 Sheets-Sheet 2
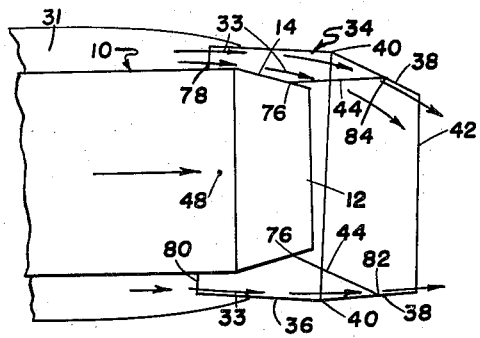
Fig. 3
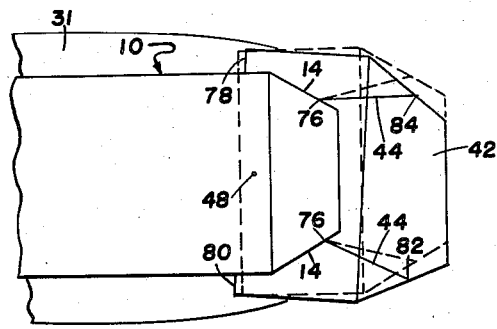
Fig. 4
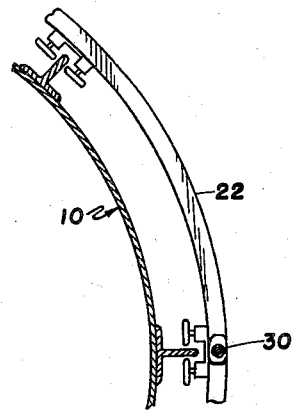
Fig. 5
Fig. 8
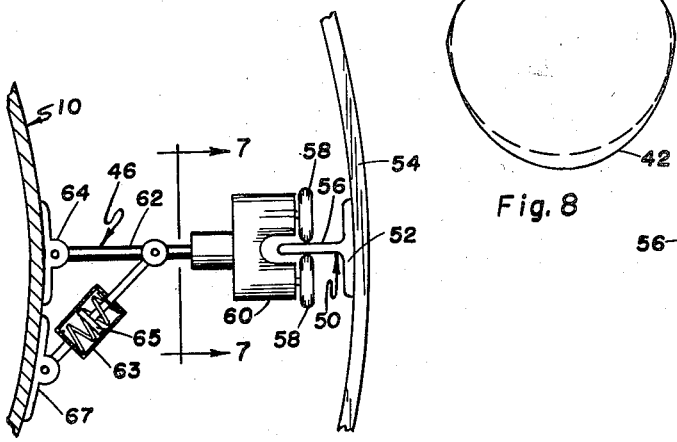
Fig. 6
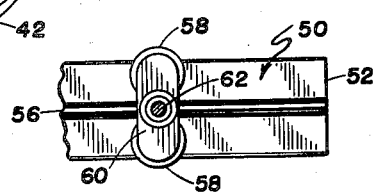
Fig. 7
INVENTOR.
NEIL W. O'ROURKE
BY
Knox & Knox ns patent office
2,846,844
Patented Aug. 12, 1958

2,846,844

VARIABLE AREA THRUST DEFLECTOR-AUGMENTER FOR JET ENGINES

Neil W. O'Rourke, La Jolla, Calif., assignor to The Ryan Aeronautical Co., San Diego, Calif., a corporation of California Application January 24, 1956, Serial No. 560,937

5 Claims. (Cl. 60—35.54)

The present invention relates generally to jet engines and more particularly to a device which provides a means of directional control of a jet propelled craft operating in a fluid medium through deflection of an exhaust stream issuing therefrom.

The primary object of this invention is to provide a thrust deflector useful in the directional control of aircraft.

Another object of this invention is to provide a thrust deflector constituting means for suitably varying the direction of thrust without dividing the flow and without materially changing the cross-sectional area of the flow channel from the dimensions thereof as determined by the adjustment of the variable primary orifice.

Another object of this invention is to provide a thrust deflector pivotally mounted rearwardly of and substantially encircling the primary jet orifice of a craft in such manner that control is obtained without increasing drag.

Another object of this invention is to provide a thrust deflector having movable area control portions operably connected with movable portions of the elements defining the primary jet orifice, thereby maintaining proportionate opening of the two orifices.

Another object of this invention is to provide a thrust deflector for jet engines which, when in axial alignment with the engine, augments the thrust therefrom, thereby improving the efficiency of the engine.

Another object of this invention is to provide a thrust deflector in which the pivotal mounting means compensates for unequal peripheral expansion or contraction of the deflector, thereby promoting continuous smooth operation.

Another object of this invention is to provide a thrust deflector which increases the flow of engine bay cooling air and deflects both this secondary flow and the primary flow to provide directional control of the aircraft.

Another object of this invention is to provide a thrust deflector in which the movable area control portions are so connected to the movable portions of the elements defining the primary jet orifice as to provide a large resultant thrust deflection with a relatively small degree of axial tilting of the deflector, this being in part due to deflection of the leaves of the secondary orifice being greater than the deflection of the deflector assembly as a whole.

Another object of this invention is to provide a thrust deflector which is adapted for fabrication from many different materials, so that the choice of material can be according to the dictates of availability and price considerations, the exact sizes and proportions being matters easily determined to suit particular conditions and needs.

Another object of this invention is to provide a thrust deflector which is practicable and inexpensive to manufacture.

Finally, it is an object to provide a thrust deflector of the aforementioned character which is simple, safe and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 3 is a fragmentary, diagrammatic drawing of an engine bay, the device operatively mounted thereon, and the flow of fluid therethrough, the area-control vanes being shown as fully opened.

Figure 4 is a fragmentary, diagrammatic drawing of an engine bay, the device operatively mounted thereon in tilted position, the neutral position being indicated by dash lines, the drawing showing primarily the unequal change of angle of opposing area control vanes for any given angular change of the shell and vanes of the augmenter as an assembly.

Figure 5 is a view taken on the line 5—5 of Figure 2, and showing the preferred mounting arrangement for the control ring.

Figure 6 is a view taken on the line 6—6 of Figure 2 showing the preferred structure for universal pivoting of the augmenter, and means for compensation of expansion loads, the spring-loaded, viscous damper being shown somewhat diagrammatically.

Figure 7 is a view taken on the line 7—7 of Figure 6.

Figure 8 is a somewhat diagrammatic drawing showing the distortion of the secondary orifice when the augmenter is in a position of maximum deflection, the original, circular shape thereof being indicated by dash lines for the purpose of comparison.

Similar characters of reference indicate similar or identical elements and portions throughout the specification and throughout the views of the drawing.

Where the normal aerodynamic control surfaces of an aircraft or missile are ineffective, for example in cases where the relative wind is negligible, it becomes desirable to deflect the exhaust jet of jet propelled aircraft and missiles so as to provide control mounts. Where this type of control is provided, consideration must be given to the other features desirable in turbojet exhaust nozzles such as: variable area; high thrust, including augmentation, if possible; provisions for an ejector to pump engine bay cooling air; and minimum weight, complexity, and space envelope requirement. The instant invention provides these features, or at least an optimized compromise between them, by providing a thrust augmenter which pumps engine bay cooling air and is tilted to provide jet deflection.

Figure 1:
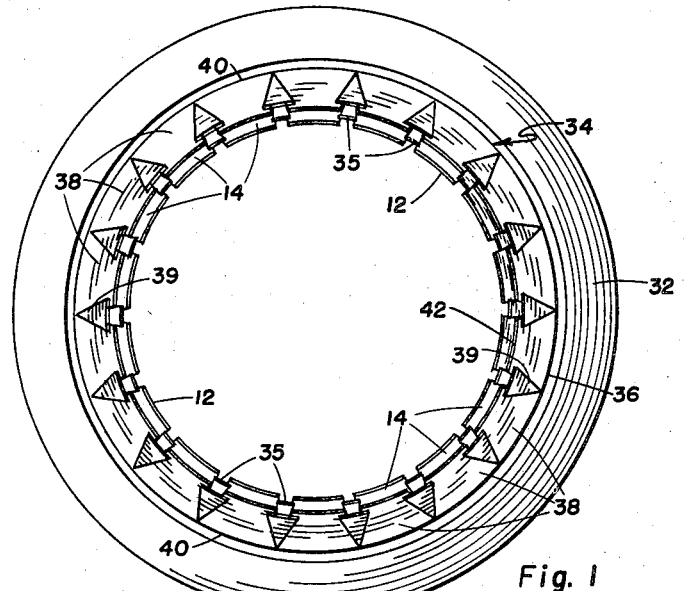
Figure 1 is a rear, end view of an aircraft engine bay, with the instant invention operatively mounted therein.
Figure 2:
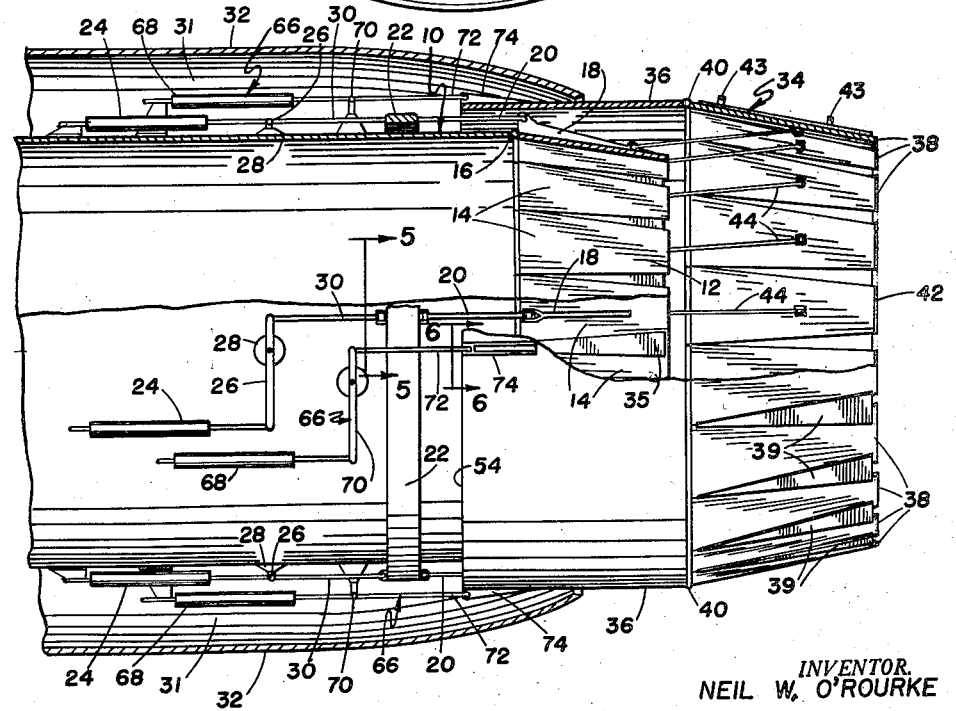
Figure 2 is a fragmentary side elevational view of an engine bay with the device operatively mounted therein, portions of the device and the engine bay being broken away to disclose underlying parts.

Referring now to the drawings, and particularly to Figure 2, there is shown the rear portion of an aircraft jet engine nozzle, hereinafter referred to as the main nozzle 10, having an iris type, variable area, primary exhaust orifice 12, consisting of wedge shaped leaves 14 having the larger end thereof pivotally mounted about the end 16 of the nozzle 10. Brackets 18 attached normally to the exterior surface of the leaves 14 provide means of attachment of control rods 20 extending forwardly therefrom to a control ring 22 which encircles the nozzle 10 and is axially slidable thereon. Hydraulic actuation cylinders 24, mounted forwardly of the ring 22 and operable by the pilot of the aircraft, pivot the arms 26 about pivot brackets 28 causing push-pull rods 30 to move the ring 22, thus moving the leaves 14 and increasing or decreasing the area of the orifice 12 as desired. A shroud 32, encircling the nozzle 10 and extending forwardly therefrom, forms the conventional engine nacelle, and provides a secondary flow channel 31 therebetween. The secondary flow 33 of air through the channel 31 provides a means of cooling the engine, and maintaining optimum operation temperature.

Cover plates 35 are spring-mounted externally of the iris-leaves 14, covering the angular slots between the leaves 14 and provide means to prevent leakage of the high-speed exhaust gas therebetween.

A deflector-augmenter assembly 34 comprises an annular member, illustrated as a cylindrical shell 36, concentric with and of slightly greater diameter than the main nozzle 10 and extending from slightly forward of the end 16 to points slightly rearwardly of the leaves 14. The assembly 34 also includes a plurality of deflectors or deflector leaves 38 pivotally attached to the rearwardly disposed end 40 of the shell 36 and forming a secondary iris type orifice 42 of slightly greater area than and slightly rearwardly of the primary orifice 12, and in axial alignment therewith.

Cover plates 39, mounted externally of the deflector leaves 38, and in contact therewith, close the gaps therebetween, and maintain the necessary deflecting action of the leaves 38. A low-efficiency seal between the cover plates 39 and the leaves 38 is sufficient since leakage at these points is not critical. Strip springs 43 attached to both the cover plates 39 and the leaves 38 maintain the position of the cover plates 39 thereon.

Links 44 attached to the inner surface of the deflector leaves 38 and the outer surface of the leaves 14 provide for area variation of the secondary orifice 42 in direct proportion to that of the orifice 12, while the shell 36 of the deflector augmenter 34 is in axial alignment with the nozzle 10, but this linearity or direct proportional relationship does not exist when the augmenter is shifted out of axial alignment. The mounting permitting such tilting will first be described and includes a plurality of mounting assemblies 46 spaced circumferentially of the main nozzle 10 and allowing a limited universal pivoting of the deflector-augmenter 34 assembly about a point 48 on the axis of the nozzle 10. As best shown in Figures 6, 7, each mounting assembly 46 comprises a length of T-shaped track 50, the transverse portion 52 of which is attached to the inner surface of the shell 36 at the forwardly disposed edge 54 thereof, the shank portion 56 of the track 50 extending radially inward therefrom. Two rollers 58 are axially pivoted in one end of a bearing housing 60 which maintains the rollers 58 in a co-planar relationship and spaced sufficiently to allow insertion of the shank portion 56 therebetween.

A plurality of rods 62 are hinge mounted externally of the nozzle 10 by means of a hinge bracket 64 and extends radially therefrom to pivotally engage the other end of the housing 60, thereby allowing the housing 60 to pivot thereon, and allowing the track 50 to tilt longitudinally between the rollers 58 without binding.

Referring again to Figure 2, the deflection controls 66 are shown as similar in principle to the means of area control, and comprise at least four hydraulic actuator cylinders 68 attached in spaced relation about the periphery of the nozzle 10 adjacent the cylinders 24. The cylinders 68 are operable by the pilot, and actuate pivot arms 70. The arms 70 move the control rods 72 which extend between one end of the pivot arms 70 and the deflector augmenter 34, the rods 72 being pivotally secured thereto by brackets 74 attached to the outer surface of the shell 36 adjacent each track 50.

The action of the deflection control assemblies 66 differs from that in the area control means in that whereas the cylinders 24 all move equally in the same direction for any change of area, each rod 72 moves a distance equal to and in a direction opposite to the rod 72 diametrically opposed therefrom.

A viscous damper 63, spring loaded on both sides of the plunger 65, has one end pivotally attached to the rod 62, adjacent the bearing housing. The other end of the damper 63 is attached to the nozzle 10 adjacent the hinge bracket 64 by means of another hinge bracket 67.

The rod 62 allows a relatively large, unequal expansion of the shell 36 quadrants, due to unequal heating of the quadrants thereof. The rod is allowed to move relatively to the nozzle 10, and thereby maintain the freedom of movement of the track 50 on the rollers 58.

The damper 63 is loaded by the deflection of the rod 62, and urges the rod 62, and therefore, the rollers back into the normal position when unequal heating is removed. The damper 63 also prevents vibration of the mounting assemblies 46 under various conditions encountered in flight and prevents the deflector-augmenter 34 from moving sideways under the temporary deflection loads. The allowable stroke of the damper 63 is limited to prevent undue side motion under deflection loads of longer duration. In brief, the shell 36 is mounted on the nozzle 10 by means of the tracks 50, illustrated in Figure 6, and controlled by the cylinders 66, although gimbal means can be substituted.

Referring now to Figure 3, the action of the device becomes quite evident. As the deflector-augmenter assembly 34 is tilted with respect to the axis of the nozzle 10, the deflector leaves 38 move into the position as shown, the distortion of the orifice 42 resulting from the relationship between the pivot points 76 of the links 44 at the leaves 14 and the fixed pivot point 48. It will be obvious that the leaves 38 diagrammatically represented in Figure 3 are illustrated in the positions of the maximum and minimum deflection thereof, assuming the axis of tilt of the deflector-augmenter 34 to be normal to the plane of the drawing, and that intermediate positions of the leaves 38 vary gradually between the two extremes to define an egg-shaped or roughly ovate-elliptic orifice 42 having the leaf 38 deflected the greatest amount toward the axis of the nozzle 10 disposed at the center of the larger end of this egg-shaped orifice.

The secondary flow, represented by the arrows 33 at the top of the engine entering the deflector 34 at 78 is increased by the increased clearance at 78 while the flow 33 entering at 80 and represented by the arrows at the bottom of the figure is decreased. The increased flow 33 at 78 is deflected by the slight angularity of the shell 36, and, again, in a greater amount, by the deflected leaves 38 in alignment therewith. Moreover, the increased flow 33 against the deflected leaves 38 as at the top promotes separation of the primary flow at the top of the nozzle and aids jet deflection.

Conversely, the flow 33 entering at 80 is restricted, promoting attachment of the flow 33 to the leaves 38. The lowered pressure at 82, and the increased pressure at 84 aid in producing a resultant sideward force against the high-speed flow of gas through the exhaust orifice 12, and results in a deflection of the said flow somewhat greater than the angular deflection of the deflector-augmenter 34.

It now becomes obvious that the invention succeeds in substantially deflecting a high speed jet exhaust by diverting a secondary flow 33 against the said exhaust, thereby providing an effective directional control of an aircraft.

The assembly denoted by the numeral 34 functions most efficiently as an augmenter when in perfect axial alignment with the nozzle 10. Moreover, the directional control is achieved without undue increase in back pressure on the engine. As represented in Figure 8, the secondary orifice is deformed from the circular and becomes egg-shaped with the cross-sectional area not greatly altered.

The instant invention was designed primarily for use with an iris-type variable area jet nozzle, but is not necessarily limited to use therewith. The cylinders 68 may be actuated in unison to move the cylindrical shell 36 axially instead of tilting this shell 36. No further structure is required to effect this axial shifting of the shell 36 and the pilot can vary the area of the secondary orifice at will, independently of the primary orifice.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. An exhaust orifice control assembly for a jet engine, comprising: a nozzle having complementary elements defining a primary orifice; said elements being shiftable to vary the area of the primary orifice; an annular member mounted around said nozzle for slight universal tilting movement relative thereto; direction controlling deflectors pivotally mounted on said member and defining a variable area secondary orifice; said annular member and deflectors having the general function of an air scoop and defining a secondary flow channel around said primary orifice; whereby tilting of said annular member results in the flow through said secondary flow channel being concentrated at one side of the secondary orifice; said elements and said deflectors constitute iris type orifices; and inflexible links connecting said elements with the corresponding deflectors so that the elements and deflectors move together.

2. An exhaust orifice control assembly for a jet engine, comprising: a nozzle having complementary elements defining a primary orifice; said elements being shiftable to vary the area of the primary orifice; an annular member mounted around said nozzle for slight universal tilting movement relative thereto; direction controlling deflectors pivotally mounted on said annular member and defining a variable area secondary orifice; said deflectors being connected to move with said elements whereby the secondary orifice varies generally with the primary orifice in cross-sectional area.

3. An assembly according to claim 2 wherein said annular member is axially shiftable causing the secondary orifice to vary in area independently of the primary orifice.

4. An assembly according to claim 2 wherein said member is mounted to tilt about a point forward of the points of connection of said links with said elements; whereby a disproportionately large tilting movement of the deflectors at one side of the secondary orifice is obtained for any given tilting movement of the annular member.

5. An assembly according to claim 2 and including a control ring to which said elements are connected directly; the opening and closing action of said deflectors being controlled solely by said elements.

References Cited in the file of this patent

UNITED STATES PATENTS

| 2,620,622 | Lundberg | Dec. 9, 1952 |
| 2,780,059 | Fiedler | Feb. 5, 1957 |

FOREIGN PATENTS

| 1,018,650 | France | Oct. 15, 1952 |
| 1,025,827 | France | Jan. 28, 1953 |